United States Patent
Gupta et al.

(10) Patent No.: US 10,652,472 B2
(45) Date of Patent: May 12, 2020

(54) ENHANCED AUTOMATIC PERSPECTIVE AND HORIZON CORRECTION

(71) Applicant: ADOBE INC., San Jose, CA (US)

(72) Inventors: Subham Gupta, Uttarakhand (IN); Poonam Bhalla, New Delhi (IN); Krishna Singh Karki, New Delhi (IN); Ajay Bedi, Himachal Pardesh (IN)

(73) Assignee: ADOBE INC., San Jose, CA (US)

( * ) Notice: Subject to any disclaimer, the term of this patent is extended or adjusted under 35 U.S.C. 154(b) by 172 days.

(21) Appl. No.: 15/902,899

(22) Filed: Feb. 22, 2018

(65) Prior Publication Data

US 2019/0260939 A1    Aug. 22, 2019

(51) Int. Cl.
  *H04N 5/232*  (2006.01)
  *H04N 1/387*  (2006.01)
  *G06T 3/60*  (2006.01)
  *G06T 3/00*  (2006.01)

(52) U.S. Cl.
  CPC .......... *H04N 5/23296* (2013.01); *G06T 3/00* (2013.01); *G06T 3/60* (2013.01); *H04N 1/3877* (2013.01); *G09G 2340/0492* (2013.01)

(58) Field of Classification Search
  CPC ..... H04N 5/23296; H04N 1/3877; G06T 3/60
  See application file for complete search history.

(56) References Cited

U.S. PATENT DOCUMENTS

| | | | | |
|---|---|---|---|---|
| 9,092,853 B2 * | 7/2015 | Sachs | ................. | H04N 5/23216 |
| 2008/0232713 A1 * | 9/2008 | Iizuka | ................... | G06K 9/4633 |
| | | | | 382/281 |
| 2008/0239107 A1 * | 10/2008 | Cho | ....................... | H04N 5/217 |
| | | | | 348/241 |
| 2010/0172598 A1 * | 7/2010 | Kimura | ................... | G06T 5/006 |
| | | | | 382/296 |
| 2010/0208057 A1 * | 8/2010 | Meier | ................... | G06T 19/006 |
| | | | | 348/135 |
| 2011/0310283 A1 * | 12/2011 | Shiozaki | ............ | H04N 5/23229 |
| | | | | 348/333.06 |
| 2012/0105578 A1 * | 5/2012 | Ohmiya | ............. | H04N 5/23238 |
| | | | | 348/36 |

(Continued)

*Primary Examiner* — Kim Y Vu
*Assistant Examiner* — Molly Delaney
(74) *Attorney, Agent, or Firm* — Shook, Hardy & Bacon L.L.P.

(57) ABSTRACT

Embodiments relate to automatic perspective and horizon correction. Generally, a camera captures an image as an image file. Capture-time orientation data from one or more sensors is used to determine the camera's attitude with respect to a defined reference frame. The orientation data and/or attitude can be registered into metadata of the image file and used to generate axis lines representative of the camera's reference frame. A reference line such as a horizon can be automatically identified from detected line segments in the image that align with one of the axis lines within a predetermined angular threshold. The reference line can be used to generate a camera transformation from a starting orientation reflected by the camera attitude to a transformed orientation that aligns the reference line with the reference frame. The transformation can be applied to the image to automatically correct perspective distortion and/or horizon tilt in the image.

20 Claims, 9 Drawing Sheets

(3 of 9 Drawing Sheet(s) Filed in Color)

(56) References Cited

U.S. PATENT DOCUMENTS

| | | | |
|---|---|---|---|
| 2013/0286221 A1* | 10/2013 | Shechtman | G06T 5/00 |
| | | | 348/187 |
| 2014/0198227 A1* | 7/2014 | Mohammad Mirzaei | |
| | | | G01C 21/12 |
| | | | 348/208.2 |
| 2015/0222786 A1* | 8/2015 | Ahmad | H04N 1/3878 |
| | | | 358/448 |
| 2016/0300322 A1 | 10/2016 | Bedi et al. | |
| 2016/0373647 A1* | 12/2016 | Garcia Morate | H04N 5/23222 |

* cited by examiner

BEFORE

AFTER

ENHANCED AUTOMATIC PERSPECTIVE AND HORIZON CORRECTION

BACKGROUND

Since the early days of photography, camera manufacturers have focused on fabricating the visual representation of human visual perspective to make photographs ("photos") look as true to life as possible. Whether using a DSLR or smartphone camera, cameras are generally rectilinear. That is to say, cameras generally attempt to capture straight lines in a scene as straight lines in a photo, which helps the human eye perceive depth within a 2-D scene and creates an image that appears natural. This approach works well when a camera is pointed directly at (i.e., perpendicular to) the subject. However, as soon as the camera is tilted in any direction, the perspective or horizon in the photo is altered and the subject may appear tilted or otherwise skewed in the resulting photo. Similarly, holding a shaky camera can result in a tilted camera, causing the perspective or horizon in a photo to appear tilted or otherwise skewed.

Perspective distortion is particularly evident in photographs that contain straight lines or geometric shapes. For example, if a photographer attempts to capture a tall building in a photo, the photographer generally must tilt the camera upwards from his position on the ground to frame the entire building in the viewfinder. Although the entire building may fit within the frame, the sides of the building will appear slanted in the resulting photo (vertical distortion). This effect occurs because the top of the building is farther away from the camera lens than the bottom of the building. Similarly, if the camera is tilted to the right or left of the perpendicular line pointing the camera squarely at the face of the building, the top and bottom of the building will appear slanted in the resulting photo (horizontal distortion). Relatedly, if the photographer tilts the camera so it is not level with the scene (a change in camera roll, using the example coordinate system of FIG. 4), the photo can appear tilted. If the photo includes a horizon, the horizon in the photo can appear tilted. Generally, perspective distortion and horizon tilt are unpleasant because they make the scene in the photo look different than the way we experience the scene in the real world.

SUMMARY

Embodiments of the present invention are directed to facilitating automatic correction of perspective distortion and horizon tilt. Generally, a camera or other user device captures an image as an image file. Capture-time orientation data from one or more sensors is used to determine the camera's attitude with respect to a defined reference frame. For example, the reference frame may be aligned with gravity and magnetic north. The orientation data and/or attitude can be registered into metadata of the image file.

An image analysis is performed to identify one or more reference lines, which can be used to correct perspective distortion and/or horizon tilt. The identification of the one or more reference lines is based on the capture-time orientation data and/or attitude of the camera. For example, the orientation data and/or attitude can be used to generate axis lines representative of the camera's reference frame. A reference line such as a horizon can be automatically identified from detected line segments in the image that align with one of the axis lines of the reference frame within a predetermined angular threshold. Advantageously, priority is given to detected line segments of longer length. For example, the detected line segments can be sorted by length to generate a sorted list. Then, beginning with the longest detected line segment, each detected line segment can be tested for alignment. As such, the sorted list can be traversed to identify a reference line as the longest detected line segment that aligns with a corresponding axis line.

The reference lines from the image can be used to generate a camera transformation from a starting orientation reflected by the camera attitude to a transformed orientation that aligns the reference lines with the reference frame. The resulting transformation can be applied to the image to automatically correct perspective distortion and/or horizon tilt in the image. As such, a user can efficiently and effectively correct perspective distortion and tilted horizons automatically using the capture-time orientation and/or attitude of a camera

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described in detail below with reference to the attached drawing figures, wherein.

DETAILED DESCRIPTION

Overview

Perspective correction is a primary step in most photography workflows. However, conventional techniques for automatically correcting a distorted perspective or horizon tilt in a photograph or other image have various drawbacks. Most conventional automatic perspective and horizon correction tools are based solely on image-content analysis.

Images having ambiguous content often misinform these tools to produce incorrect results.

For example, some conventional automatic perspective and horizon correction tools can successfully reduce or remove certain perspective distortion, for example, reducing or removing the keystone effect in photos of buildings, leveling horizons, and straightening images. Such conventional tools generally work well to correct perspective distortion and horizon tilt in images that contain distinct lines. However these conventional tools can produce incorrect results for images that include many dominant lines. These failures generally occur when the applied content analysis cannot distinguish between tilted lines that should be corrected (e.g., tilted horizons or converging verticals) and tilted lines that should not be corrected (e.g., true vanishing lines, lines in objects such as art, lines in surface textures, etc.). Often times, such conventional tools attempt to correct perspective by improperly assuming that all the tilted lines in an image result from perspective distortion. This can result in erroneous and undesirable results.

Figure 1:
FIG. 1 is an example image with a tilted horizon.
Figure 2:
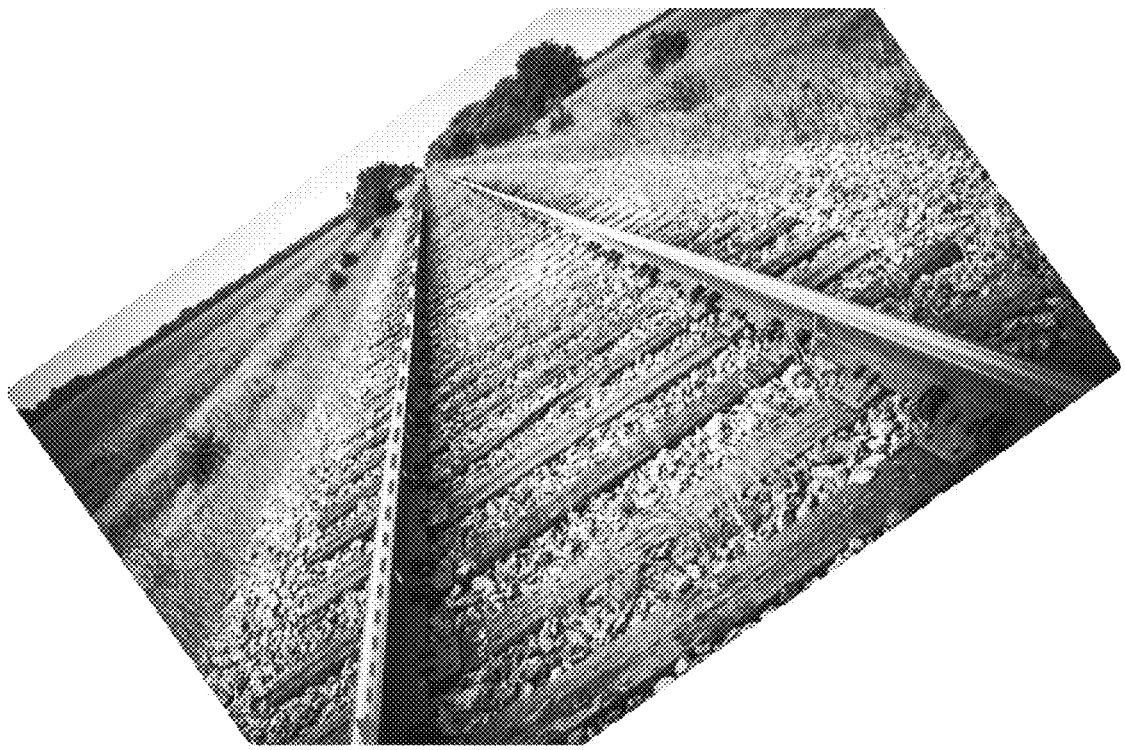
FIG. 2 is an example of an erroneous correction applied to the example image in FIG. 1 using a conventional automatic perspective and horizon correction tool.

For example, some conventional automatic perspective and horizon correction tools attempt to correct perspective based on a determination of the longest line detected in the image. If the image contains longer lines than those that need to be corrected, the tool will produce incorrect results. By way of example, FIG. 1 depicts an image of a railway track converging into the horizon. The image has a variety of lines, including the railway track, the horizon and a number of wooden cross-ties. In this image, the horizon is slightly tilted, which can result from horizontal camera-tilt when the photo was taken. Applying a conventional automatic perspective and horizon correction tool can result in the image depicted in FIG. 2. As will be appreciated, the conventional automatic perspective and horizon correction tool incorrectly transformed the image of FIG. 1. This result occurred because the tool identified the line segment of the railway track identified with an arrow as the longest line in the image, and utilized this line as the dominant line in the image. Using this dominant line as a reference instead of the line segment along the horizon, the conventional automatic perspective and horizon correction tool treated the train track as if it was a product of distortion, and the resulting transform attempted to make the train track vertical. As such, this conventional technique produced an erroneous and undesirable result.

Currently, to overcome this conventional drawback, some software tools permit a user to enter a manual input to assist an automatic perspective and horizon correction. In such guided tools, users need to manually draw horizontal and vertical lines on the image being corrected. These user inputs assist the content analysis to fix true distortions. However, drawing horizontal and vertical lines over the image is tedious and time consuming for users, especially on mobile devices where the screen size is small and touch gestures are not capable of precise recognition. As such, there is a need for improvement in conventional automatic perspective and horizon correction tools.

Accordingly, embodiments of the present invention are directed to facilitating automatic perspective and horizon correction using the capture-time attitude of a camera. In particular, orientation data from one or more camera sensors is used to determine the capture-time attitude of the camera relative to a defined reference frame. The camera attitude can be represented as tilt angles along x, y and z axes of the reference frame. The orientation data and/or camera attitude can be automatically registered into metadata of the image file.

The image is automatically analyzed to detect line segments in the image. From the detected line segments, horizontal and vertical reference lines are identified. To accomplish this, horizontal and vertical axes of the camera's reference frame are derived from the orientation data and/or attitude registered in the image metadata. As such, the horizontal and vertical reference lines can be identified from detected line segments in the image that align with the horizontal and vertical axes of the reference frame within a predetermined angular threshold, giving priority to detected line segments of a longer length. These reference lines can be used to generate target parameters for a camera transformation that, when applied to the image, aligns the horizontal reference line with the horizontal axis and the vertical reference line with the vertical axis. The target parameters can be registered into image metadata, and the 3D rotation can be automatically applied. The resulting transform functions to automatically correct perspective in the image.

As such, using implementations described herein, a user can efficiently and effectively correct perspective distortion and tilted horizons automatically using the capture-time orientation and/or attitude of a camera. This enhanced automatic perspective and horizon correction technique is effective regardless of the presence of dominant tilted lines in an image that do not result from perspective distortion, thereby solving a common problem with conventional automatic perspective and horizon correction tools. Moreover, the enhanced automatic perspective and horizon correction technique does not require a manual user input conventionally used to assist in the identification of reference lines. Accordingly, the enhanced automatic perspective and horizon correction technique disclosed herein improves upon conventional image editing workflows by providing enhanced accuracy and reliability, while requiring less manual effort.

Having briefly described an overview of aspects of the present invention, various terms used throughout this description are provided. Although more details regarding various terms are provided throughout this description, general descriptions of some terms are included below to provider a clearer understanding of the ideas disclosed herein:

Perspective distortion—Perspective distortion refers to tilted or otherwise skewed lines in an image resulting from camera tilt. Generally, when a camera is pointed directly at (i.e., perpendicular to) a subject, and the portions of the subject appearing in the camera frame are substantially equidistant to the camera, straight lines in the subject generally appear as straight lines in the photo. However, if the camera is tilted, the perspective in the photo can be altered and the subject may appear tilted or otherwise skewed in the resulting photo. Perspective distortion can be vertical and/or horizontal.

Reference frame—As used herein, a reference frame is a baseline system of geometric axes with a fixed orientation from which to measure changes in the orientation of a camera or other user device. A reference frame can be defined in various ways. For example, a reference coordinate system (e.g., Cartesian, cylindrical, spherical, etc.) can be aligned with gravity, magnetic north, true north, an arbitrarily defined direction and/or some other reference direction. Taking a set of Cartesian rotational axes as an example, a vertical axis (e.g., y) can be aligned with gravity, and a perpendicular axis can be defined with respect to magnetic north. As such, the attitude of device can be defined with respect to the defined reference frame.

Figure 4:
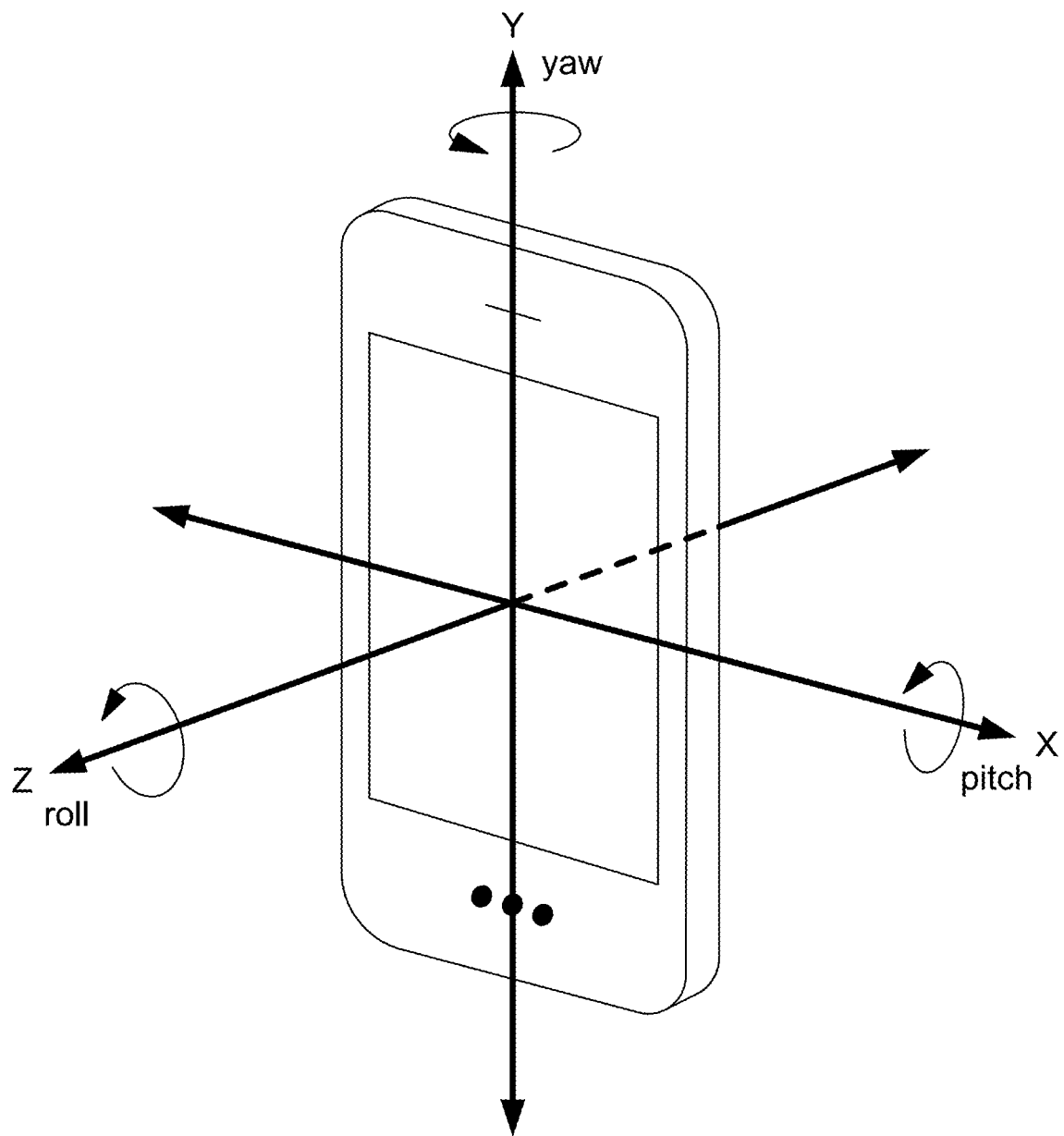
FIG. 4 depicts an example device coordinate system, in accordance with embodiments of the present invention.

Attitude—Attitude refers to the orientation of a camera or other user device with respect to a defined reference frame. In order to measure attitude, a device coordinate system is defined with axes that are fixed to a particular device orientation. Using the example device coordinate system of FIG. 4, a set of Cartesian rotational axes are fixed to the orientation of the camera/phone illustrated in FIG. 4. In this example, the z-axis is aligned with the camera so the camera points along the z-axis, and when the phone is held upright as depicted, the x-axis is horizontally aligned and the y-axis is vertically aligned. Using these device axes, the device attitude can be defined as the difference between the device coordinate system and the defined reference frame. This difference can be expressed as pitch, yaw and roll.

Orientation data—Generally, one or more sensors such as a gyroscope, accelerometer and/or magnetometer can be used to provide an indication of the orientation of a camera or other user device. For example, an accelerometer can detect linear motion, a gyroscope can detect rotational motion, and a magnetometer can detect magnetic fields such as those indicating magnetic north. This sensor data can be used to determine the attitude of the camera/phone. Collectively, the measurements taken by the sensors used to determine the attitude of a camera/phone are referred to as orientation data.

Exemplary Automatic Perspective Correction Environment

Figure 3:
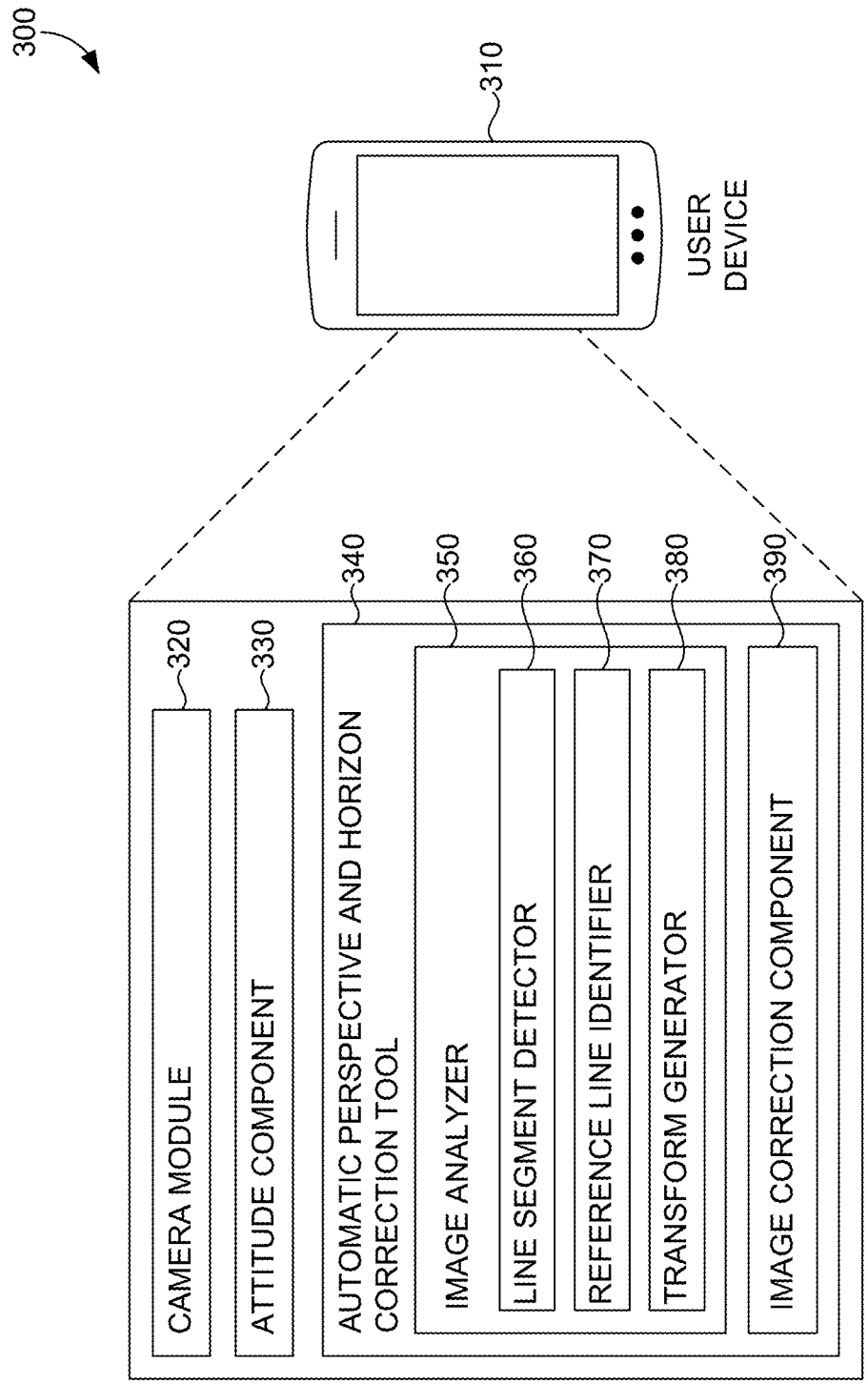
FIG. 3 is a block diagram of an exemplary computing system for automatically correcting perspective distortion, in accordance with embodiments of the present invention.

Referring now to FIG. 3, a block diagram of exemplary environment 300 suitable for use in implementing embodiments of the invention is shown. Generally, environment 300 is suitable for automatic perspective and horizon correction, and among other things, facilitates automatic perspective and horizon correction using the capture-time orientation data and/or attitude of a camera.

Environment 300 includes a user device 310 having camera module 320, attitude component 330 and automatic perspective and horizon correction tool 340. Generally, camera module 320 captures an image, attitude component 330 determines and registers capture-time orientation data and/or attitude of user device 310 into metadata of the image, and automatic perspective and horizon correction tool 340 automatically corrects perspective distortion and horizon tilt in the image using the orientation data and/or attitude of user device 310. In an embodiment, user device 310 is a smart phone or other computing device capable of taking photographs. For example, although user device 310 is depicted as a smart phone in FIG. 3, in some embodiments, user device 310 is any type of camera such as a DSLR, SLR, compact, bridge, mirrorless, action, 360, film, etc. Generally, user device 310 can be any computing device such as computing device 1100, as described below with reference to FIG. 11. In embodiments, user device 310 can be smart phone or other mobile computing device, a camera, wearable technology, or the like.

As illustrated, user device 310 includes camera module 320. In embodiments where user device 310 is capable of digital photography, camera module 320 includes a lens and a photo sensor. The lens can be a collection of optical elements that focus light onto the photo sensor. The photo sensor can be an integrated circuit with one or more photodetectors configured to capture light through the lens. Software such as a photo application controls, coordinates or otherwise communicates with the photo sensor (and in some embodiments, other elements such as a shutter and/or an aperture) to capture and store a digital image. The image can be stored in any known image file type, including raster formats such as JPEG, TIFF and GIF, vector formats, compound formats, stereo formats, etc.

Continuing with FIG. 3, user device 310 includes attitude component 330. Attitude component 330 may be incorporated or integrated into an application, or an add-on or plug-in to an application, such as a photo application capable of capturing photographs or other images using camera module 320. The photo application may be a stand-alone application, a mobile application, a web application, or the like. In some cases, the photo application can be integrated into the operating system of user device 310 (e.g., as a service). Although attitude component 330 is generally described herein as being associated with a photo application, in some cases, attitude component 330, or portion thereof, can be additionally or alternatively integrated into the operating system (e.g., as a service) or a server (e.g., a remote server).

Attitude component 330 generally determines the attitude of user device 310 relative to a defined reference frame. The reference frame can be defined in various ways. For example, a reference coordinate system (e.g., Cartesian, cylindrical, spherical, etc.) can be aligned with gravity, magnetic north, true north, an arbitrarily defined direction and/or some other reference direction. Taking a set of Cartesian rotational axes as an example, a vertical axis (e.g., y) can be aligned with gravity, and a perpendicular axis can be defined with respect to magnetic north. Although this definition is used as an example reference frame, any other reference frame may be utilized. The defined reference frame can be pre-determined, configurable, or otherwise.

In order to measure attitude, a device coordinate system is defined for user device 110 with axes that are fixed to a particular orientation of user device 310. Using this particular device orientation, the attitude of user device 310 can defined as the difference between the device coordinate system and the defined reference frame. This difference can be expressed as pitch, yaw and roll. Taking the device coordinate system of FIG. 4 as an example, a set of Cartesian rotational axes are fixed to the orientation of the camera/phone illustrated in FIG. 4. In this example, the z-axis is aligned with the camera so the camera points along the z-axis, and when the phone is held upright as depicted, the x-axis is horizontally aligned and the y-axis is vertically aligned. Although this device coordinate system is used as an example, any other device coordinate system may be utilized. The device coordinate system can be pre-determined, configurable, or otherwise.

Attitude component 330 determines the attitude of user device 310 relative to the defined reference frame using orientation data from one or more sensors. Various sensors can be utilized to detect orientation, including accelerometers, gyroscopes, magnetometers, proximity sensors, light sensors, some combination thereof, or otherwise. In some embodiments, the one or more sensors are on-board to user device 310. However, this need not be the case as some embodiments can utilize one or more external sensors such as cameras or light sensors to detect or facilitate the detection of the orientation of user device 310. Collectively, the measurements taken by the one or more sensors used to determine attitude are referred to as orientation data.

Attitude component 330 determines the attitude of user device 310 based on orientation data from one or more sensors using any known technique. In one example for iOS, the CMDeviceMotion class includes attitude as a member that returns the orientation of the device (i.e., the device coordinate system) in the form of roll, pitch and yaw angles relative to a defined reference frame. Although attitude component 330 is described herein as determining the attitude of user device 310 in the form of tilt angles such as roll, pitch and yaw, any other form and/or any technique for determining the attitude of user device 310 may be implemented, as will be understood by those of ordinary skill in the art.

Attitude component 330 determines the attitude of user device 310 at a capture-time associated with image capture. For example, when a camera or smart phone captures and stores a digital image as an image file, some devices associate a single time with the image (e.g., a timestamp). As such, in some embodiments, attitude component 330 can determine the attitude of user device 310 at the time associated with the image. In some embodiments, an image can be associated with a time duration during which image capture takes place or is otherwise associated (e.g., the time duration in which the shutter of a DSLR camera is open, the time duration in which the photo sensor captures light, etc.). As such, attitude component 330 can determine the attitude of user device 310 at any time within such a duration (e.g., the starting, middle or ending time), continuously throughout the duration, some derivate thereof such as a change in attitude during the duration, some combination thereof, or otherwise.

Moreover, the attitude determination can be made at any time. In some embodiments, attitude determination occurs in association with image capture, such as at capture-time (or substantially the same time), and the attitude can be stored for later use. Additionally and/or alternatively, capture-time orientation data can be stored for a later attitude determination. In some embodiments, attitude component 330 automatically registers the orientation data and/or attitude of user device 310 into metadata of the image file. For example, the orientation data and/or attitude of user device 310 can be stored as a part of XMP metadata, or using some other metadata registration technique. By way of nonlimiting example, consider an attitude <x°, y°, z°> of <−12.0°, 1.0°, 5.8°> at a time associated with image capture. In this example, the attitude can be automatically registered in XMP metadata for the image file as <xmp:gyro>−12.0, 1.0, 5.8</xmp: gyro>. By storing the orientation data and/or attitude of user device 310, this information can be utilized during photo editing or other subsequent image analysis. More specifically and as explained in more detail below, the orientation data and/or attitude of user device 310 can be used to detect lines in the corresponding image that align with the reference frame.

Continuing with FIG. 3, user device 310 includes automatic perspective and horizon correction tool 340. Automatic perspective and horizon correction tool 340 may be incorporated, or integrated, into an application or an add-on or plug-in to an application, such as an application capable of facilitating photo editing. As can be appreciated, in some embodiments, in addition to facilitating photo editing, the application may also facilitate the correction of perspective distortion and horizon tilt in an image. The application may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). Exemplary applications that may be used for photo editing include ADOBE® LIGHTROOM and ADOBE® CAMERA RAW. Although automatic perspective and horizon correction tool 340 is described herein as being associated with an application, in some cases, automatic perspective and horizon correction tool 340, or portion thereof, can be additionally or alternatively integrated into the operating system (e.g., as a service) or a server (e.g., a remote server).

In the embodiment illustrated in FIG. 3, automatic perspective and horizon correction tool 340 is depicted as residing on the same device as camera module 320 and attitude component 330. However, this need not be the case, and in some embodiments, a photo or other image may be captured with one device (e.g., a smart phone or DSLR camera), and automatic perspective and horizon correction, or a portion thereof, can be performed on the image using with one or more other devices (e.g., a computer workstation, a remote server, some combination thereof, and the like). As such, any or all of the components of automatic perspective and horizon correction tool 340 can, but need not, reside on the same device which captures images.

As illustrated, automatic perspective and horizon correction tool 340 includes image analyzer 350 and image correction component 390. Image analyzer 350 generally analyzes an image file, including orientation data and/or attitude of user device 310, to identify reference lines in the image that align with the reference frame. From these reference lines, image analyzer 350 generates target parameters for a camera transformation and image correction component 390 applies the camera transformation to the image to automatically correct perspective distortion and/or image tilt (e.g., tilted horizons). Any or all of these functions can occur automatically at the time the image is taken (i.e., substantially the same time as the image is captured). Additionally and/or alternatively, a software feature (e.g., a UI button) allowing a user to automatically correct perspective distortion and/or horizon tilt can be provided. As such, any or all of the functions of automatic perspective and horizon correction tool 340 can occur automatically at the time an input is received via the software feature. Other variations on timing and triggering the automated analysis will be understood by those of ordinary skill in the art.

In the embodiment depicted in FIG. 3, image analyzer 350 includes line segment detector 360, reference line identifier 370 and transform generator 380. Generally, line segment detector 360 performs digital image processing to detect line segments from an image, reference line performs digital image processing to identify reference lines from the detected line segments that align with the reference frame of user device 310, and transform generator 380 generates target parameters for a camera transformation based on the identified reference lines in the image.

Line segment detector 360 performs digital image processing on an image to detect line segments in the image. First, line segment detector 360 detects edges in the image and may generate a corresponding edge map for the image. In some embodiments, line segment detector 360 generates an edge map using a modified canny edge detector. The modified canny edge detector is considered modified based upon the application of adaptive hysteresis localization and thresholding to reduce the detection of false edges based on noise in a digital image and to detect edges that more closely approximate the edges in the image. The result is a black and white image identifying lines and/or points representing detected edges in the image.

After detecting edges in an image, line segment detector 360 detects line segments from the detected edges (e.g., from the edge map). In some embodiments, this is accomplished in a conventional manner using a probabilistic Hough transformation of the edge map. Generally, a probabilistic Hough Transformation improves on the standard Hough transformation by using curve fitting to avoid the computationally expensive voting process performed by the standard Hough transformation for every non-zero (e.g., not black) pixel. Generally, for a set of image pixels (x, y), the probabilistic Hough transform detects line segments described by the parametric equation r=x*cos(theta)+y*sin(theta) using a two-dimensional accumulator array, as will be understood by those of ordinary skill in the art. As such, the accumulator can be searched for line segments using a predefined threshold. More specifically, for each pixel and its neighborhood, the probabilistic Hough transform determines if there is enough evidence of a straight line at that pixel using the predefined threshold. For each detected line segment, line segment detector 360 calculates the parameters (r, θ) of the line segment, determines the bin of the accumulator within which those parameters fall, and increments the value of the bin. In this manner, the probabilistic Hough transformation results in the detection of relatively fewer, more accurate line segments than detection using the standard Hough transformation. The detected lines segments can be stored in a data structure, such as a vector storing a list of all the detected lines.

Figure 5:
FIG. 5 depicts an example illustration of detected line segments, in accordance with embodiments of the present invention.

FIG. 5 depicts an illustration of line segments detected from the image of FIG. 1. In FIG. 5, the original image is represented in black and white and the detected line segments are represented in color to provide contrast for the illustration of the detected line segments. As such, FIG. 5 illustrates an example of a potential output from line segment detector 360. From these detected line segments, some conventional automatic perspective and horizon correction tools identify one or more reference lines based on a determination of the longest detected line segment. Techniques disclosed herein identify reference lines based on capture-time orientation data and/or attitude of user device 310.

More specifically, reference line identifier 370 accesses the capture-time orientation data and/or attitude registered in metadata for an image, and generates axis lines representative of the reference frame based on the accessed orientation data and/or attitude. Advantageously, reference line identifier 370 sorts the detected line segments by length to generate a sorted list of detected line segments. As such, reference line identifier 370 identifies reference lines from the detected line segments that align with one of the axis lines representative of the reference frame, giving priority to detected line segments of a longer length. These reference lines can be utilized to generate and/or apply a camera transformation to the image.

For example, in some embodiments, reference line identifier 370 generates a horizontal axis line parallel to the horizontal axis of the reference frame and a vertical axis line parallel to the vertical axis of the reference frame. In these embodiments, the horizontal and vertical axis lines will be used to determine angles formed with the detected line segments from the image. As such, the horizontal and vertical axis lines can be generated or otherwise represented using the same coordinate system used to represent the detected lines. By way of nonlimiting example, in embodiments where detected line segments are expressed using 2D Cartesian coordinates (x, y) representing the location of corresponding pixels in the image, horizontal and vertical axis lines can be generated using the same coordinate system.

Various techniques can be applied to generate the horizontal and vertical axis lines parallel to the horizontal and vertical axes of the reference frame. By way of nonlimiting example, a first point can be selected (e.g., arbitrarily), and a second point can be generated which forms a horizontal axis line. The second point can be generated using the registered orientation data and/or attitude of user device 310. For example, in the embodiments which utilize the device coordinate system depicted in FIG. 4 and which define the reference frame with respect to gravity, the tilt in the z direction (the roll) represents the angular deviation from being level. This roll can be accessed or otherwise derived from registered metadata. As such, the second point can be generated using the roll and standard trigonometry to form a horizontal axis line parallel to the horizontal axis line of the reference frame, as will be understood by those of ordinary skill in the art. In a similar manner, a vertical axis line can be defined by the first point & a third point generated using the roll and standard trigonometry. The horizontal and vertical axis lines need not share a common point, so in some embodiments, the vertical axis line can be defined by a third point (e.g., arbitrarily selected) and a fourth point generated using the roll and standard trigonometry. Other variations for generating horizontal and vertical axis lines based on orientation data and/or attitude will be understood by those of ordinary skill in the art and are contemplated within the present disclosure.

Using these horizontal and vertical axis lines, reference line identifier 370 can select reference lines from the detected line segments that align with a corresponding axis lines within a predetermined angular threshold. Advantageously, reference line identifier 370 gives priority to detected line segments of a longer length. By way of nonlimiting example, reference line identifier 370 can sort the detected line segments by length to generate a sorted list. Starting with the longest detected line segment in the sorted list, reference line identifier 370 determines the angle between the line segment and one or more of the axis lines (e.g., the horizontal axis line). Reference line identifier 370 filters out and/or bypasses detected line segments for which the determined angle exceeds the predetermined angular threshold (e.g., 5°) and moves on to the next detected line segment in the sorted list. Reference line identifier 370 selects as a reference line (e.g., the horizontal reference line) the longest detected line segment for which the determined angle falls within the predetermined threshold. Often times, the identified horizontal reference line will be the horizon in the image. As such, reference line identifier 370 can be considered to detect the horizon in the image. In a similar manner, reference line identifier 370 can identify a vertical reference line from the detected line segments that aligns with the vertical axis line within a predetermined angular threshold, giving priority to detected line segments of a longer length. The determinations of the horizontal and vertical reference lines can occur in any order. In some embodiments, detected line segments are tested for horizontal and vertical alignment before moving on to test subsequent detected line segments. In some embodiments, reference line identifier 370 can save for later use each detected line segment for which the determined angle falls within the predetermined threshold.

To reduce processing time, reference line identifier 370 can traverse the sorted list, iterating through successive detected line segments to test for alignment. Once a detected line segment has been identified for which the determined angle falls within the predetermined angular threshold, subsequent iterations can be eliminated. That is, in these embodiments, application of the angular threshold to shorter lines in the sorted list can be eliminated or otherwise avoided.

Figure 6:
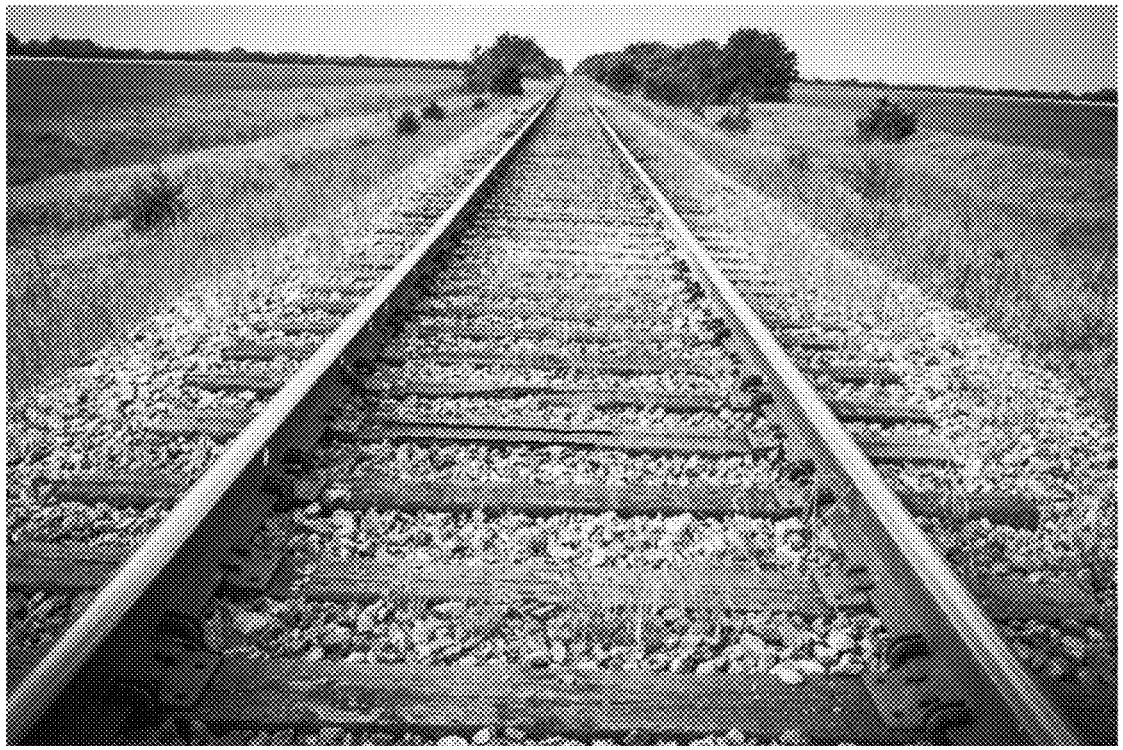
FIG. 6 depicts an example illustration of detected line segments that align with a horizontal axis of a camera's reference frame within a predetermined angular threshold, in accordance with embodiments of the present invention.

FIG. 6 depicts an example illustration of the detected line segments from FIG. 5 that align with a horizontal axis of a camera's reference frame within a predetermined angular threshold. In FIG. 6, the original image is represented in black and white and the detected line segments are represented in color to provide contrast for the illustration of the detected line segments. The embodiment illustrated in FIG. 5 depicts all detected line segments that satisfy the angular threshold. As such, in this embodiment, reference line identifier 370 identifies the longest of the illustrated line segments as the horizontal reference line. The reference lines identified by reference line identifier 370 can be utilized to generate and/or apply a camera transformation.

In this manner, transform generator 380 generates target parameters for a camera transformation based on the horizontal and vertical reference lines. For example, transform generator 380 can generate a camera transformation (e.g., a rotational matrix) from the camera orientation reflected by the capture-time attitude of user device 310 (which is also the orientation reflected in the image) to a camera orientation (i) that aligns the horizontal reference line with the horizontal axis of the reference frame and (ii) that aligns the vertical reference line with the vertical axis of the reference frame. As described above, the attitude of user device 310 can be accessed or otherwise derived from registered metadata. Any number of conventional techniques can be applied to generate these target parameters, as will be understood by those of ordinary skill in the art. In some embodiments, transform generator 380 registers the target parameters into metadata of the image (e.g., by using XMP metadata or some other metadata registration technique).

In the embodiment depicted in FIG. 3, automatic perspective and horizon correction tool 340 includes image correction component 390. Image correction component 390 accesses the target parameters and automatically applies the corresponding camera transformation to correct perspective distortion and/or a tilted image (e.g., a tilted horizon). Generally, the camera transformation can be understood with respect to its rotational components. Using the device coordinate system depicted in FIG. 4, a transformation in the z direction (changes in roll) functions to align the image with a horizontal axis of the reference frame. Meanwhile, the transformations in the x and y directions (changes in pitch and yaw) function to automatically correct perspective in the image. The horizon correction and perspective distortion correction can be applied automatically at the time the image is taken (i.e., substantially the same time as the image is captured). Additionally and/or alternatively, a software feature (e.g., a UI button) allowing a user to automatically correct perspective distortion and/or horizon tilt can be provided. As such, camera transformations that correct perspective distortion and horizon tilt can be performed separately (e.g., separate UI buttons for each correction) or together (a UI button that applies both corrections), as will be understood by those of ordinary skill in the art. Other variations on timing and triggering these corrections will be understood by those of ordinary skill in the art.

Figure 7:
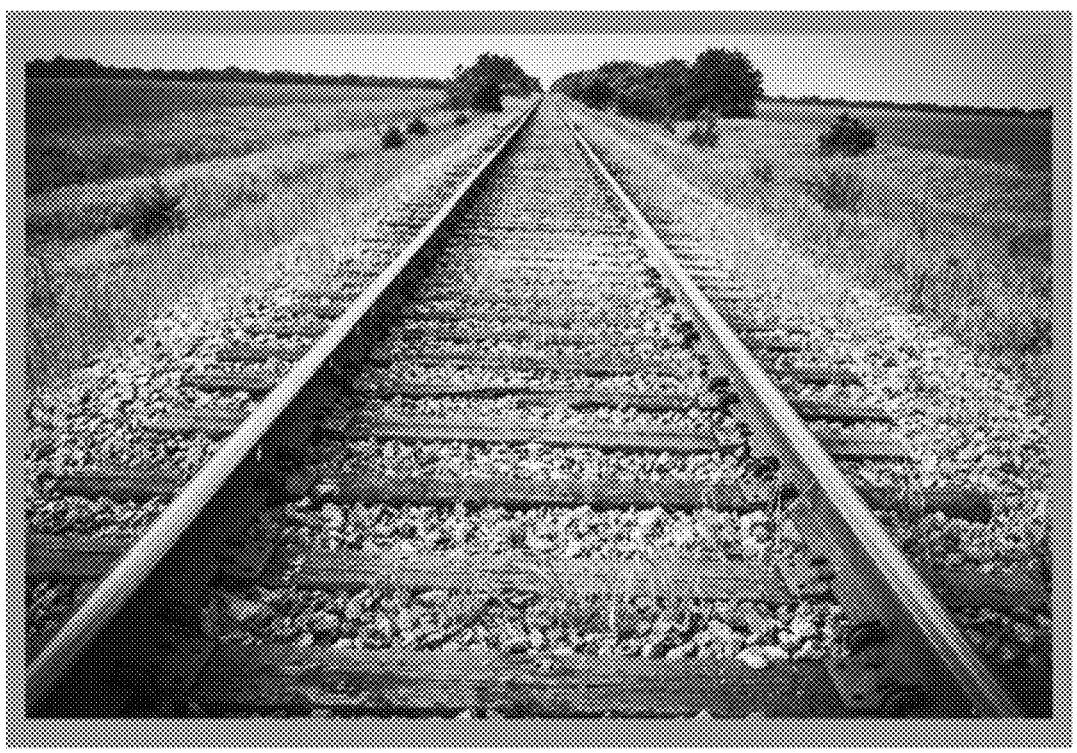
FIG. 7 depicts an example image with a tilted horizon before and after applying automatic perspective and horizon correction, in accordance with embodiments of the present invention.
Figure 7:
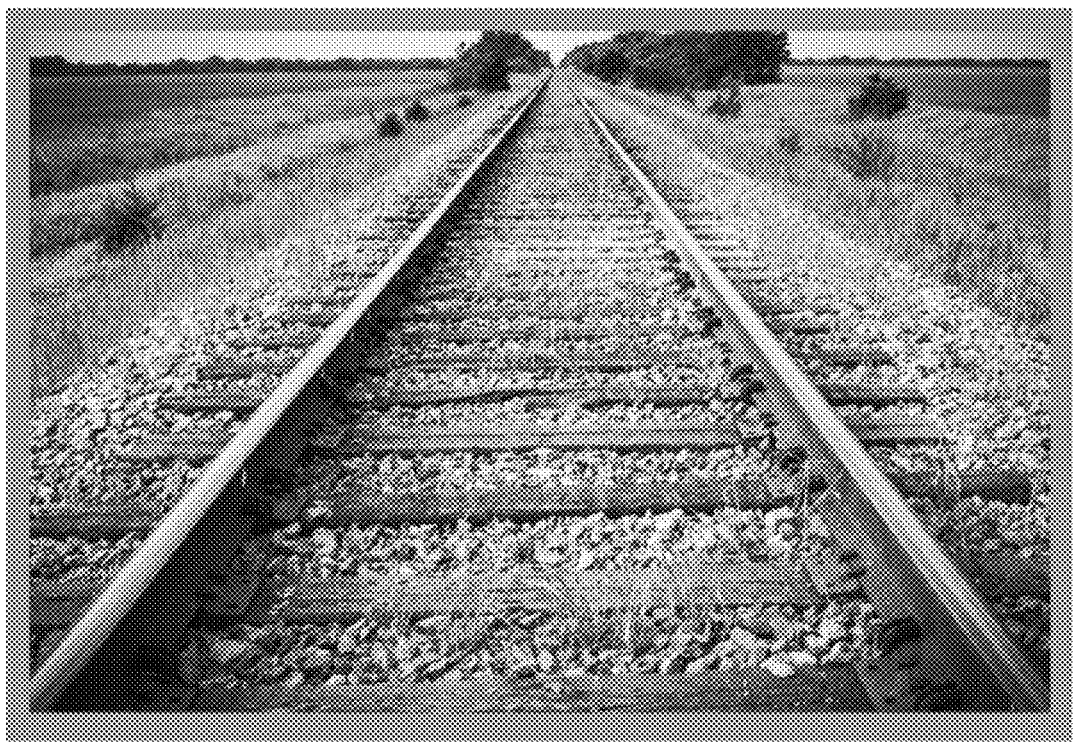

FIG. 7 depicts an example image with a tilted horizon before and after applying the enhanced automatic perspective and horizon correction described herein. The "before" image is the same image from FIG. 1 for which a conventional automatic perspective and horizon correction tool produced the erroneous correction depicted in FIG. 2. As will be appreciated, the enhanced automatic perspective and horizon correction techniques disclosed herein properly identified the horizon in the "before" image of FIG. 7 and applied a transformation to produce the "after" image of FIG. 7 to align the detected horizon with the reference frame of the camera.

As such, using implementations described herein, a user can efficiently and effectively correct perspective distortion and tilted horizons automatically using the capture-time orientation and/or attitude of a camera. This enhanced automatic perspective and horizon correction technique is effective regardless of the presence of dominant tilted lines in an image that do not result from perspective distortion, thereby solving a common problem with conventional automatic perspective and horizon correction tools. Moreover, the enhanced automatic perspective and horizon correction technique does not require a manual user input conventionally used to assist in the identification of reference lines. Accordingly, the enhanced automatic perspective and horizon correction technique disclosed herein improves upon conventional image editing workflows by providing enhanced accuracy and reliability, while requiring less manual effort.

Exemplary Flow Diagrams

Figure 8:
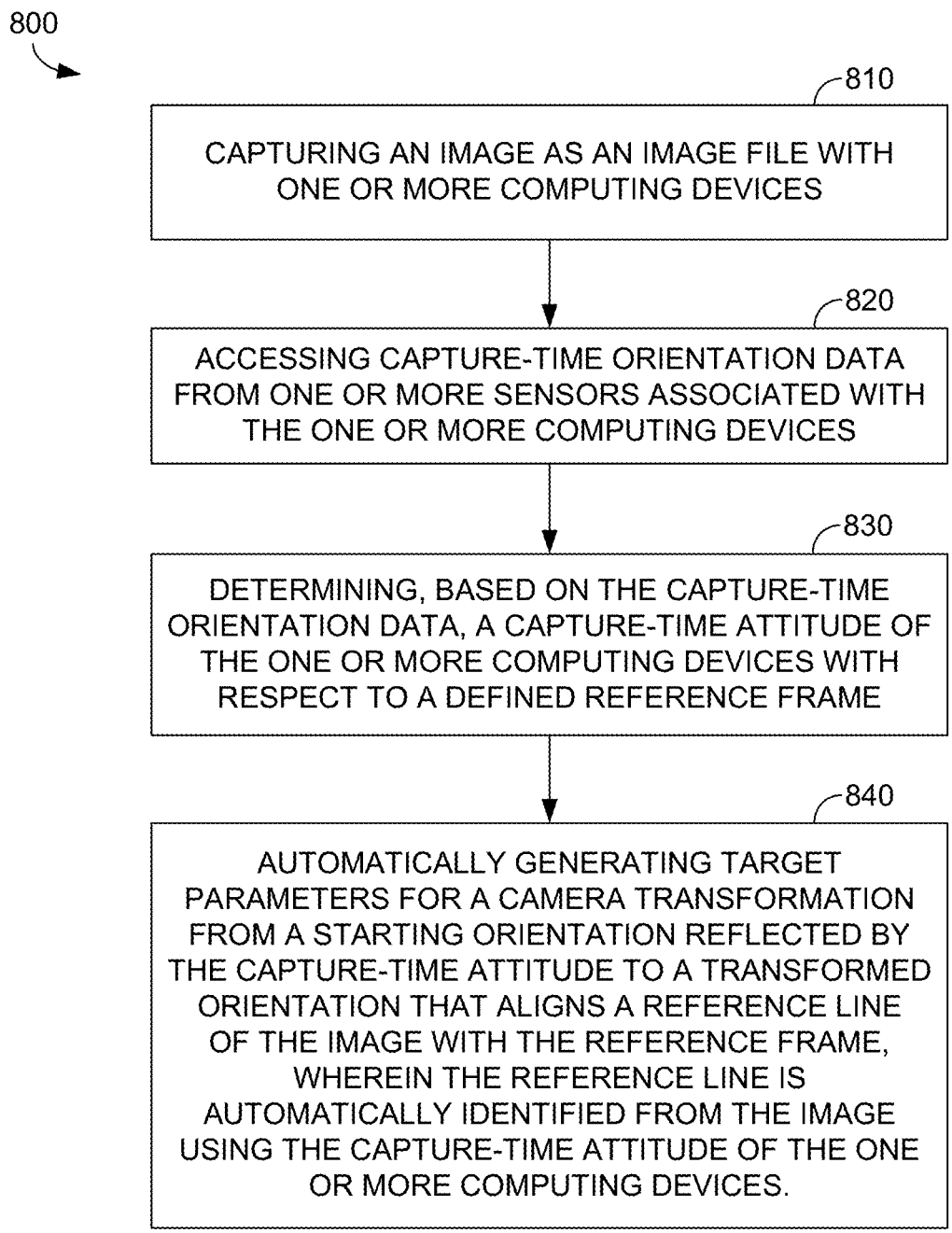
FIG. 8 is a flow diagram showing a method for facilitating automatic perspective and horizon correction, in accordance with embodiments of the present invention.
Figure 9:
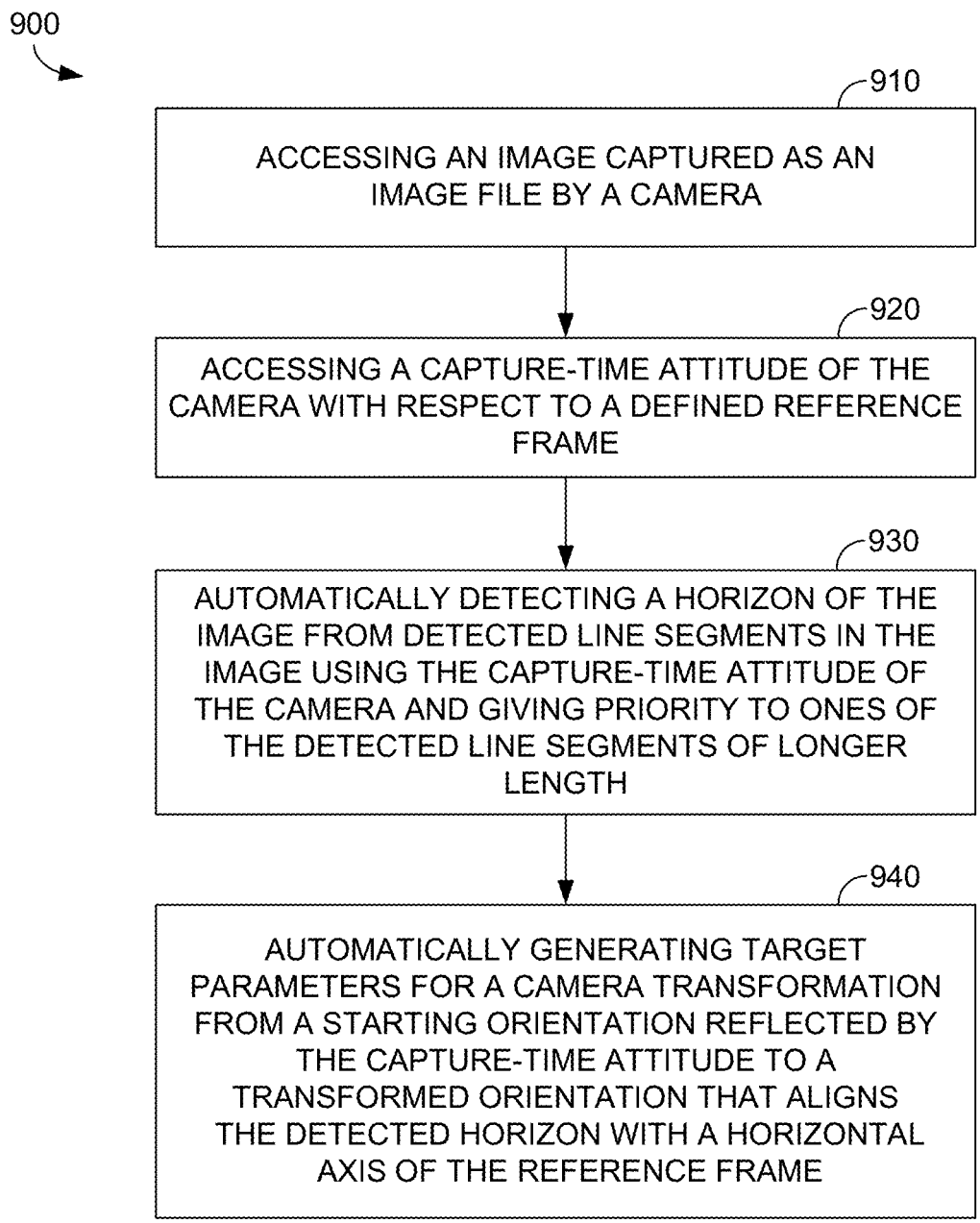
FIG. 9 is a flow diagram showing a method for facilitating automatic perspective and horizon correction, in accordance with embodiments of the present invention.

With reference now to FIGS. 8-9, flow diagrams are provided illustrating methods for facilitating automatic perspective and horizon correction. Each block of the methods 800 and 900 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 8, FIG. 8 illustrates a method 800 for facilitating automatic perspective and horizon correction, in accordance with embodiments described herein. Initially at block 810, an image is captured as an image file with one or more computing devices such as a camera. At block 820, capture-time orientation data is accessed from one or more sensors associated with the one or more computing devices. At block 830, a capture-time attitude of the one or more computing devices with respect to a defined reference frame is determined based on the capture-time orientation data. The capture-time orientation data and/or capture-time attitude can be registered into metadata of the image file. At block 840, target parameters are automatically generated for a camera transformation from a starting orientation reflected by the capture-time attitude to a transformed orientation that aligns a reference line of the image with the reference frame. The reference line is automatically identified from the image using the capture-time attitude of the one or more computing devices. The camera transformation can be automatically applied to the image to correct at least one of perspective distortion or horizon tilt in the image.

Turning now to FIG. 9, illustrates a method 900 for facilitating automatic perspective and horizon correction, in accordance with embodiments described herein. Initially at block 910, an image captured as an image file by a camera is accessed. At block 920, a capture-time attitude of the camera with respect to a defined reference frame is accessed. At block 930, a horizon of the image is automatically detected from detected line segments in the image using the capture-time attitude of the camera, giving priority to ones of the detected line segments of longer length. At block 940, target parameters are automatically generated for a camera transformation from a starting orientation reflected by the capture-time attitude to a transformed orientation that aligns the detected horizon with a horizontal axis of the reference frame.

Exemplary Computing Environment

Figure 10:
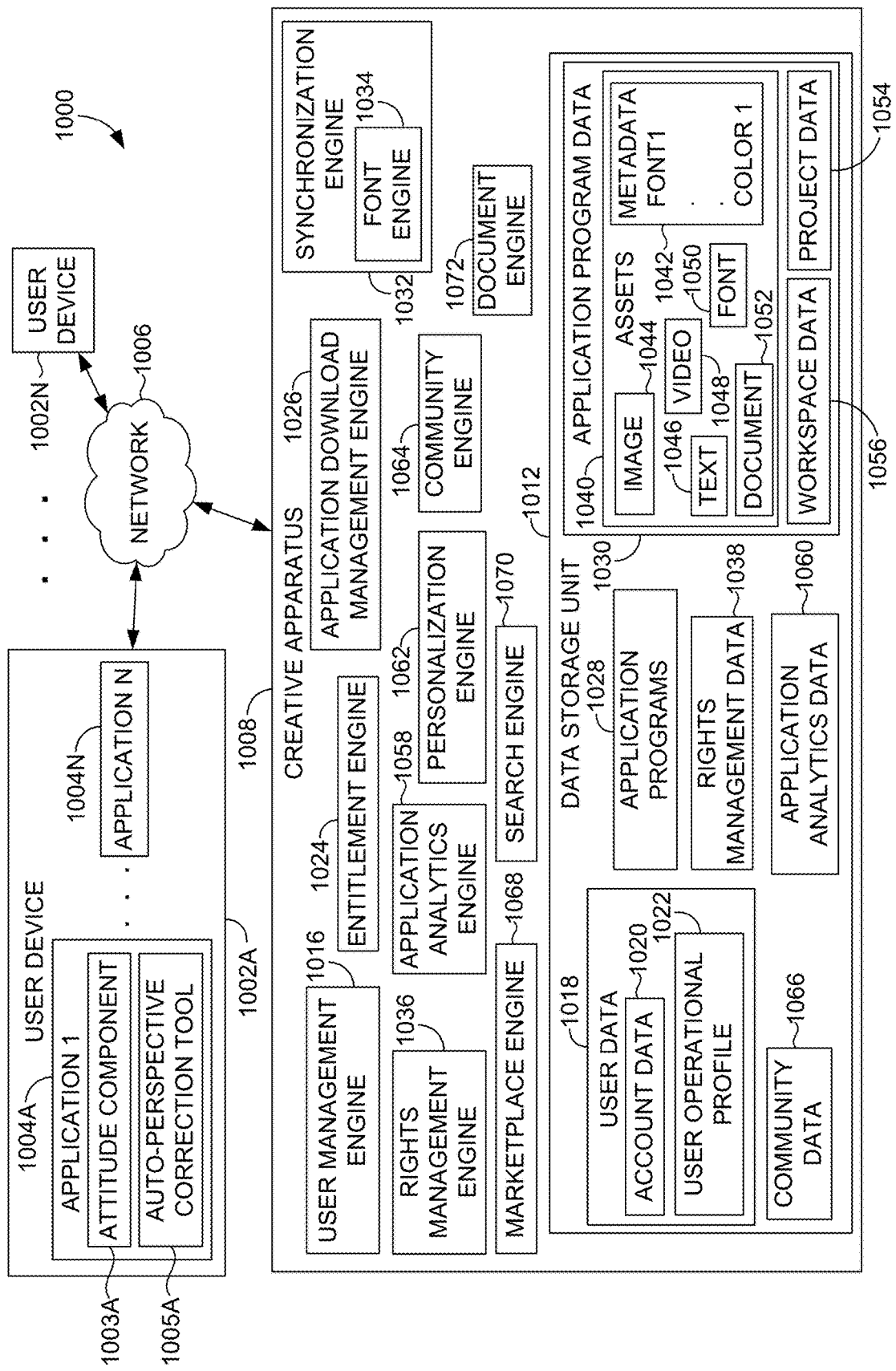
FIG. 10 is a block diagram of an exemplary computing environment in which embodiments of the invention may be employed.

FIG. 10 is a diagram of environment 1000 in which one or more embodiments of the present disclosure can be practiced. Environment 1000 includes one or more user devices, such as user devices 1002A-1002N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 1008. It is to be appreciated that following description may generally refer to user device 1002A as an example and any other user device can be used.

A user of the user device can utilize various products, applications, or services supported by creative apparatus 1008 via network 1006. User devices 1002A-1002N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 1008.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 1002A-1002N can be connected to creative apparatus 1008 via network 1006. Examples of network 1006 include, but are not limited to, internet, local area network (LAN), wireless area network, wired area network, wide area network, and the like.

Creative apparatus 1008 includes one or more engines for providing one or more digital experiences to the user. Creative apparatus 1008 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 1008 also includes data storage unit 1012. Data storage unit 1012 can be implemented as one or more databases or one or more data servers. Data storage unit 1012 includes data that is used by the engines of creative apparatus 1008.

A user of user device 1002A visits a webpage or an application store to explore applications supported by creative apparatus 1008. Creative apparatus 1008 provides the applications as a software as a service (SaaS), or as a standalone application that can be installed on user device 1002A, or as a combination. The user can create an account with creative apparatus 1008 by providing user details and also by creating login details. Alternatively, creative apparatus 1008 can automatically create login details for the user in response to receipt of the user details. In some embodiments, the user is also prompted to install an application manager. The application manager enables the user to manage installation of various applications supported by creative apparatus 1008 and also to manage other functionalities, such as updates, subscription account and the like, associated with the applications. User details are received by user management engine 1016 and stored as user data 1018 in data storage unit 1012. In some embodiments, user data 1018 further includes account data 1020 under which the user details are stored.

The user can either opt for a trial account or can make payment based on type of account or subscription chosen by the user. Alternatively, the payment can be based on product or number of products chosen by the user. Based on payment details of the user, user operational profile 1022 is generated by entitlement engine 1024. User operational profile 1022 is stored in data storage unit 1012 and indicates entitlement of the user to various products or services. User operational profile 1022 also indicates type of user, i.e. free, trial, student, discounted, or paid.

In some embodiment, user management engine 1016 and entitlement engine 1024 can be one single engine performing the functionalities of both the engines.

The user can then install various applications supported by creative apparatus 1008 via an application download management engine 1026. Application installers or application programs 1028 present in data storage unit 1012 are fetched by application download management engine 1026 and made available to the user directly or via the application manager. In one embodiment, an indication of all application programs 1028 are fetched and provided to the user via an interface of the application manager. In another embodiment, an indication of application programs 1028 for which the user is eligible based on user's operational profile are displayed to the user. The user then selects application programs 1028 or the applications that the user wants to download. Application programs 1028 are then downloaded on user device 1002A by the application manager via the application download management engine 1026. Corresponding data regarding the download is also updated in user operational profile 1022. Application program 1028 is an example of the digital tool. Application download management engine 1026 also manages the process of providing updates to user device 1002A.

Upon download, installation and launching of an application program, in one embodiment, the user is asked to provide the login details. A check is again made by user management engine 1016 and entitlement engine 1024 to ensure that the user is entitled to use the application program. In another embodiment, direct access is provided to the application program as the user is already logged into the application manager.

The user uses one or more application programs 1004A-1004N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 1030 in data storage unit 1012 by synchronization engine 1032. Alternatively or additionally, such data can be stored at the user device, such as user device 1002A.

Application program data 1030 includes one or more assets 1040. Assets 1040 can be a shared asset which the user wants to share with other users or which the user wants to offer on a marketplace. Assets 1040 can also be shared across multiple application programs 1028. Each asset includes metadata 1042. Examples of metadata 1042 include, but are not limited to, font, color, size, shape, coordinate, a combination of any of these, and the like. In addition, in one embodiment, each asset also includes a file. Examples of the file include, but are not limited to, image 1044, text 1046, video 1048, font 1050, document 1052, a combination of any of these, and the like. In another embodiment, an asset only includes metadata 1042.

Application program data 1030 also include project data 1054 and workspace data 1056. In one embodiment, project data 1054 includes assets 10. In another embodiment, assets 1040 are standalone assets. Similarly, workspace data 1056 can be part of project data 1054 in one embodiment while it may be standalone data in other embodiment.

A user can operate one or more user device to access data. In this regard, application program data 1030 is accessible by a user from any device, including a device which was not used to create assets 1040. This is achieved by synchronization engine 1032 that stores application program data 1030 in data storage unit 1012 and enables application program data 1030 to be available for access by the user or other users via any device. Before accessing application program data 1030 by the user from any other device or by any other user, the user or the other user may need to provide login details for authentication if not already logged in. In some cases, if the user or the other user are logged in, then a newly created asset or updates to application program data 1030 are provided in real time. Rights management engine 1036 is also called to determine whether the newly created asset or the updates can be provided to the other user or not. Workspace data 1056 enables synchronization engine 1032 to provide a same workspace configuration to the user on any other device or to the other user based on rights management data 1038.

In various embodiments, various types of synchronization can be achieved. For example, the user can pick a font or a color from user device 1002A using a first application program and can use the font or the color in a second application program on any other device. If the user shares the font or the color with other users, then the other users can also use the font or the color. Such synchronization generally happens in real time. Similarly, synchronization of any type of application program data 1030 can be performed.

In some embodiments, user interaction with applications 1004 is tracked by application analytics engine 1058 and stored as application analytics data 1060. Application analytics data 1060 includes, for example, usage of a tool, usage of a feature, usage of a workflow, usage of assets 1040, and the like. Application analytics data 1060 can include the usage data on a per user basis and can also include the usage data on a per tool basis or per feature basis or per workflow basis or any other basis. Application analytics engine 1058 embeds a piece of code in applications 1004 that enables the application to collect the usage data and send it to application analytics engine 1058. Application analytics engine 1058 stores the usage data as application analytics data 1060 and processes application analytics data 1060 to draw meaningful output. For example, application analytics engine 1058 can draw an output that the user uses "Tool 4" a maximum number of times. The output of application analytics engine 1058 is used by personalization engine 1062 to personalize a tool menu for the user to show "Tool 4" on top. Other types of personalization can also be performed based on application analytics data 1060. In addition, personalization engine 1062 can also use workspace data 1056 or user data 1018 including user preferences to personalize one or more application programs 1028 for the user.

In some embodiments, application analytics data 1060 includes data indicating status of a project of the user. For example, if the user was preparing an article in a digital publishing application and what was left was publishing the prepared article at the time the user quit the digital publishing application, then application analytics engine 1058 tracks the state. Now when the user next opens the digital publishing application on another device, then the user is indicated and the state and options are provided to the user for publishing using the digital publishing application or any other application. In addition, while preparing the article, a recommendation can also be made by synchronization engine 1032 to incorporate some of other assets saved by the user and relevant for the article. Such a recommendation can be generated using one or more engines, as described herein.

Creative apparatus 1008 also includes community engine 1064 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 1040. Community engine 1064 stores any data corresponding to the community, such as work shared on the community and comments or likes received for the work as community data 1066. Community data 1066 also includes notification data and is used for notifying other users by the community engine in case of any activity related to the work or new work being shared. Community engine 1064 works in conjunction with synchronization engine 1032 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 1064 and synchronization engine 1032. In collaborative workflows, a plurality of users is assigned different tasks related to the work.

Creative apparatus 1008 also includes marketplace engine 1068 for providing marketplace to one or more users. Marketplace engine 1068 enables the user to offer an asset for selling or using. Marketplace engine 1068 has access to assets 1040 that the user wants to offer on the marketplace. Creative apparatus 1008 also includes search engine 1070 to enable searching of assets 1040 in the marketplace. Search engine 1070 is also a part of one or more application programs 1028 to enable the user to perform search for assets 1040 or any other type of application program data 1030. Search engine 1070 can perform a search for an asset using metadata 1042 or the file.

Creative apparatus 1008 also includes document engine 1072 for providing various document related workflows, including electronic or digital signature workflows, to the user. Document engine 1072 can store documents as assets 1040 in data storage unit 1012 or can maintain a separate document repository (not shown in FIG. 5).

In accordance with embodiments of the present invention, application programs 1028 include a photo application that facilitates capturing and storing a digital image. In these embodiments, the photo application can be provided to user device 1002A (e.g., as application 1004N) such that the photo application operates via the user device. In another embodiment, a photo capturing tool (e.g., attitude component 1003A) is provided as an add-on or plug-in to an application such as a photo application, as further described with reference to FIG. 3 above. Additionally and/or alternatively, the photo application can facilitate automatic perspective and horizon correction. In some embodiments, a photo editing tool (e.g., auto perspective correction tool 1005A) is provided as an add-on or plug-in to an application such as a photo editing application, as further described with reference to FIG. 3 above. These configurations are merely exemplary, and other variations of software functionality for facilitating automatic perspective and horizon correction are contemplated within the present disclosure.

It is to be appreciated that the engines and working of the engines are described as examples herein, and the engines can be used for performing any step in providing digital experience to the user.

Exemplary Operating Environment

Figure 11:
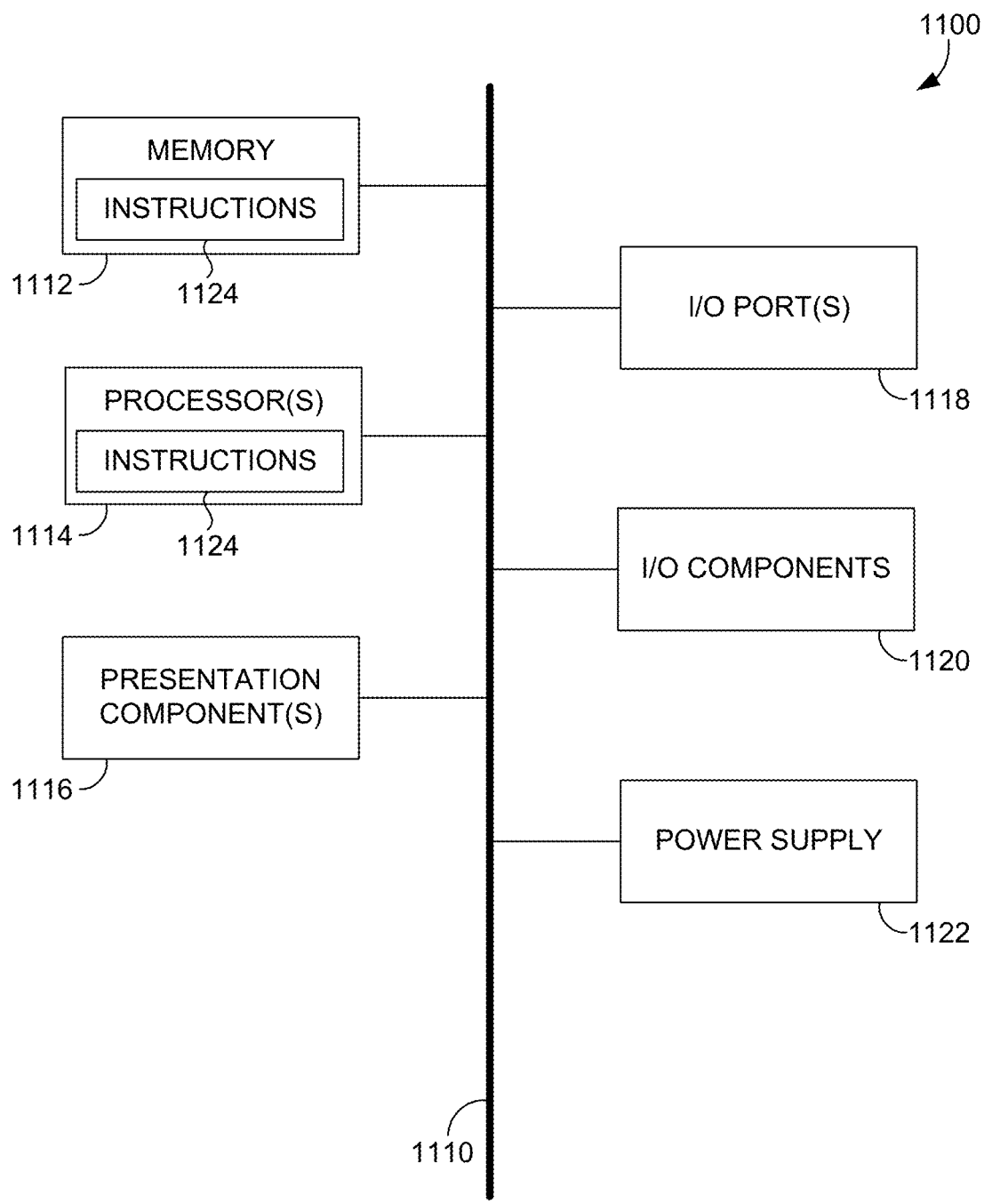
FIG. 11 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output (I/O) ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1100. Computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of computing device 1100 to render immersive augmented reality or virtual reality.

Embodiments described herein support automatic perspective and horizon correction. The components described herein refer to integrated components of an automatic perspective and horizon correction system. The integrated components refer to the hardware architecture and software framework that support functionality using the automatic perspective and horizon correction system. The hardware architecture refers to physical components and interrelationships thereof and the software framework refers to software providing functionality that can be implemented with hardware embodied on a device.

The end-to-end software-based automatic perspective and horizon correction system can operate within the automatic perspective and horizon correction system components to operate computer hardware to provide automatic perspective and horizon correction system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the automatic perspective and horizon correction system components can manage resources and provide services for the automatic perspective and horizon correction system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
    capturing an image as an image file with the one or more computing devices;
    accessing capture-time orientation data from one or more sensors associated with the one or more computing devices;
    determining, based on the capture-time orientation data, a capture-time attitude of the one or more computing devices with respect to a defined reference frame;
    automatically identifying a reference line from the image using the capture-time attitude of the one or more computing devices; and
    generating target parameters for a camera transformation from a starting orientation reflected by the capture-time attitude to a transformed orientation that aligns the reference line with the reference frame.

2. The media of claim 1, the operations further comprising registering the capture-time attitude into metadata of the image file.

3. The media of claim 1, the operations further comprising:
    automatically detecting line segments from the image;
    automatically generating, using the capture-time attitude, an axis line parallel to a horizontal or a vertical axis of the reference frame; and
    automatically identifying the reference line from ones of the detected line segments that align with the axis line within a predetermined angular threshold.

4. The media of claim 3, wherein automatically identifying the reference line comprises giving priority to detected line segments of longer length.

5. The media of claim 1, the operations further comprising registering the target parameters into metadata of the image.

6. The media of claim 1, the operations further comprising automatically applying the camera transformation to the image to correct at least one of perspective distortion or horizon tilt in the image.

7. The media of claim 1, wherein the reference frame is aligned with at least one of gravity or magnetic north.

8. A computerized method for facilitating the automatic correction of horizon tilt in an image, the method comprising:
   accessing the image captured as an image file by a camera;
   accessing a capture-time attitude of the camera with respect to a defined reference frame;
   automatically detecting a horizon of the image from detected line segments in the image, giving priority to ones of the detected line segments of longer length, using the capture-time attitude of the camera; and
   automatically generating target parameters for a 3D camera transformation from a starting orientation reflected by the capture-time attitude to a transformed orientation that aligns the detected horizon with a horizontal axis of the reference frame.

9. The media of claim 8, wherein giving priority to detected line segments of longer length comprises:
   sorting the detected line segments by length to generate a sorted list;
   iterating through the sorted list to identify a longest detected line segment that aligns with the horizontal axis; and
   based on identifying the longest detected line segment, avoiding subsequent iterations of shorter line segments in the sorted list.

10. The method of claim 8, additionally comprising accessing the capture-time attitude from metadata of the image file.

11. The method of claim 8, additionally comprising:
    automatically generating, using the capture-time attitude, a horizontal axis line parallel to the horizontal axis of the reference frame; and
    automatically identifying the horizon from ones of the detected line segments that align with the horizontal axis line within a predetermined angular threshold.

12. The method of claim 8, additionally comprising registering the target parameters into metadata of the image.

13. The method of claim 8, additionally comprising automatically applying the 3D camera transformation to the image to correct the horizon tilt.

14. The method of claim 8, wherein the reference frame is aligned with gravity.

15. A computer system comprising:
    one or more hardware processors and memory configured to provide computer program instructions to the one or more hardware processors;
    a camera module comprising a photo sensor, wherein the camera module is configured to capture an image as an image file;
    an attitude component configured to:
        access capture-time orientation data from one or more sensors associated with the camera module; and
        determine, based on the capture-time orientation data, a capture-time attitude of the one or more computing devices with respect to a defined reference frame; and
    a means for automatically generating target parameters for a camera transformation based on the capture-time orientation data.

16. The computer system of claim 15:
    wherein the camera transformation is from a starting orientation reflected by the capture-time attitude to a transformed orientation that aligns a horizontal reference line of the image with a horizontal axis of the reference frame and that aligns a vertical reference line of the image with a vertical axis line of the reference frame; and
    wherein the means for automatically generating target parameters for a camera transformation is additionally configured to automatically identify the reference line from the image using the capture-time attitude of the camera module.

17. The computer system of claim 16, wherein the means for automatically generating target parameters for a camera transformation is additionally configured to:
    automatically detect line segments from the image;
    automatically generate, using the capture-time attitude, a horizontal axis line parallel to the horizontal axis of the reference frame;
    automatically generate, using the capture-time attitude, a vertical axis line parallel to the vertical axis of the reference frame;
    automatically identify the horizontal reference line from ones of the detected line segments that align with the horizontal axis line within a predetermined angular threshold; and
    automatically identify the vertical reference line from ones of the detected line segments that align with the vertical axis line within the predetermined angular threshold.

18. The computer system of claim 17, wherein the means for automatically generating target parameters for a camera transformation is additionally configured to automatically identify at least one of the horizontal reference line or the vertical reference line by giving priority to detected line segments of longer length.

19. The computer system of claim 15, wherein the means for automatically generating target parameters for a camera transformation is additionally configured to register the target parameters into metadata of the image.

20. The computer system of claim 15, additionally comprising an image correction component configured to automatically apply the camera transformation to the image to correct at least one of perspective distortion or horizon tilt in the image.

* * * * *